(12) United States Patent
Lee et al.

(10) Patent No.: US 8,325,021 B2
(45) Date of Patent: Dec. 4, 2012

(54) REMOTE CONTROLLING SYSTEM FOR ELECTRIC DEVICE

(75) Inventors: Hoonbong Lee, Changwon-shi (KR); Yong-Tae Kim, Gymhae-shi (KR)

(73) Assignee: LG Electronics Inc., Seoul (KR)

( * ) Notice: Subject to any disclaimer, the term of this patent is extended or adjusted under 35 U.S.C. 154(b) by 1159 days.

(21) Appl. No.: 11/790,082

(22) Filed: Apr. 23, 2007

(65) Prior Publication Data
US 2008/0042868 A1    Feb. 21, 2008

(30) Foreign Application Priority Data
Apr. 25, 2006 (KR) .................... 10-2006-0037404

(51) Int. Cl.
*G05B 11/01* (2006.01)
(52) U.S. Cl. .................................. 340/12.22
(58) Field of Classification Search ............ 340/825.72, 340/5.61, 12.22, 12.5, 426.13
See application file for complete search history.

(56) References Cited

U.S. PATENT DOCUMENTS

| | | | | |
|---|---|---|---|---|
| 4,241,870 A | * | 12/1980 | Marcus | 296/37.7 |
| 6,127,941 A | * | 10/2000 | Van Ryzin | 340/825.69 |
| 6,489,986 B1 | * | 12/2002 | Allen | 348/14.01 |
| 7,136,709 B2 | * | 11/2006 | Arling et al. | 700/65 |
| 2002/0194621 A1 | * | 12/2002 | Tran et al. | 725/139 |
| 2005/0140574 A1 | * | 6/2005 | Tamura | 345/9 |

FOREIGN PATENT DOCUMENTS
KR    10-2005-0066459 A    6/2005
* cited by examiner

*Primary Examiner* — Vernal Brown
(74) *Attorney, Agent, or Firm* — KED & Associates LLP

(57) ABSTRACT

A remote controlling system for an electric device includes one or more electric devices for communicating with a remote controlling device through a wireless communication network. The one or more electric devices transmit state information to the remote controlling device according to a state request command from the remote controlling device, and control a predetermined operation according to an operation control command from the remote controlling device. The remote controlling device is supplied with power by a common power source for transmitting the state request command to the electric device selected by the user, receiving the state information from the electric device, and displaying the state information, or transmitting the operation control command to the electric device.

15 Claims, 13 Drawing Sheets

REMOTE CONTROLLING SYSTEM FOR ELECTRIC DEVICE

TECHNICAL FIELD

The present invention relates to a remote controlling system for an electric device, and more particularly, to a remote controlling system for an electric device which can control operations of electric devices such as a washer and a dryer and display states thereof.

BACKGROUND ART

In general, when the user puts dirty laundry into a wash tub, a washer washes the laundry by mixing a detergent and water, and rinses and dries the laundry.

In addition, a clothes dryer dries the laundry by absorbing moisture from the laundry by sending hot air generated by a heater into a drum.

The washer and the dryer are mostly installed indoors, but can be installed in a special space such as an outside warehouse or an underground washing room.

Recently, researches have been actively made to do housework without temporal and spatial restrictions, by connecting home devices to an internet environment and remotely controlling operations of the home devices.

Especially, researchers have made efforts to apply such a technology to a product which performs one operation for a relatively long time, such as the washer and the dryer. However, when the washer is not operated over a predetermined time, the power supply of the washer is automatically cut to minimize power consumption. In the case that the power supply of the washer is cut, the washer cannot be remotely controlled.

When the user intends to do remote controlling and monitoring through an internet, a PC for monitoring must be continuously turned on and a home network must be installed. As a result, the unit cost of production increases.

Moreover, when the washer and the dryer are installed in the outside warehouse or the underground washing room, it is difficult to set up the network environment. To operate the washer or the dryer, the user must carry the laundry, put the laundry into the washer or the dryer and input an operation command. To check an operation state of the washer or the dryer, the user must frequently go to the washer or the dryer.

In addition, the user cannot continuously check an error state which may occur during the operation. Accordingly, although the washer or the dryer is not operated due to an error generated in the washing or drying operation, the user does not recognize the error and leaves the washer or the dryer in the error state.

It is also inconvenient for the user to go to the washer or the dryer and input the operation command.

In order to solve the foregoing problems, referring to FIG. 1, a monitoring device 10 is mounted indoors so that the user can check operation states of a washer 20 and a dryer 30 installed outdoors.

However, the conventional monitoring device 10 displays only the state of the product selected by the user. That is, when the user selects the washer 20, the monitoring device 10 displays the state of the washer 20, and when the user selects the dryer 30, the monitoring device 10 displays the state of the dryer 30.

Therefore, in the case that an error occurs in the product which has not been selected by the user, the monitoring device 10 cannot inform the user of the error state.

In the conventional art, the user can control the on and off functions of the washer 20 and the dryer 30 such as an operation and a temporary stop, but cannot control the detailed operations of the washer 20 and the dryer 30.

Moreover, the user cannot check by the monitoring device 10 whether the current states of the washer 20 and the dryer 30 are controllable or incontrollable. When the user attempts to control the operations of the washer 20 and the dryer 30 in the incontrollable state, the user may misunderstand that the monitoring device 10 has been out of order.

DISCLOSURE OF THE INVENTION

The present invention is achieved to solve the above problems. An object of the present invention is to provide a remote controlling system for an electric device which can display states of electric devices such as a washer and a dryer and control operations thereof by selection of the user.

Another object of the present invention is to provide a remote controlling device which enables the user to easily control operations of electric devices by displaying states of the electric devices before controlling the operations of the electric devices.

Yet another object of the present invention is to provide a remote controlling device which can reduce the capacity of the whole components and improve reception of signals.

Yet another object of the present invention is to provide a remote controlling device which can guarantee mobility in its installation position through wireless communication.

Yet another object of the present invention is to provide a remote controlling method for an electric device which can display generation of events (state, error, operation end, operation state change, etc.) according to display priority.

In order to achieve the above-described objects of the invention, there is provided a remote controlling system for an electric device, including: one or more electric devices for communicating with a remote controlling device through a wireless communication network, transmitting state information to the remote controlling device according to a state request command from the remote controlling device, and controlling a predetermined operation according to an operation control command from the remote controlling device; and the remote controlling device supplied with power by a common power source, for transmitting the state request command to the electric device selected by the user, receiving the state information from the electric device, and displaying the state information, or transmitting the operation control command to the electric device.

In another aspect of the present invention, there is provided a remote controlling device, including: an input unit for acquiring a user input including at least one of electric device selection, a state request input for the selected electric device and an operation control input for the selected electric device; a transmitting/receiving unit for performing communication through a wireless communication network; a display unit for displaying states of one or more electric devices; a storing unit for storing reference information relating to a state request command and an operation control command; a power supply unit applied with common power, for supplying power to be used; and a control unit for generating the state request command or the operation control command on the basis of the reference information by the user input from the input unit, transmitting the state request command or the operation control command to the electric device through the transmitting/receiving unit, and displaying the state of the electric device on the display unit.

In yet another aspect of the present invention, there is provided a remote controlling method for an electric device in a remote controlling device communicating with one or more electric devices through a predetermined wireless communication network, the remote controlling method including the steps of: receiving state information of the electric device; and displaying the state information according to display priority.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A remote controlling system for an electric device in accordance with preferred embodiments of the present invention will now be described in detail with reference to the accompanying drawings.

Figure 1:
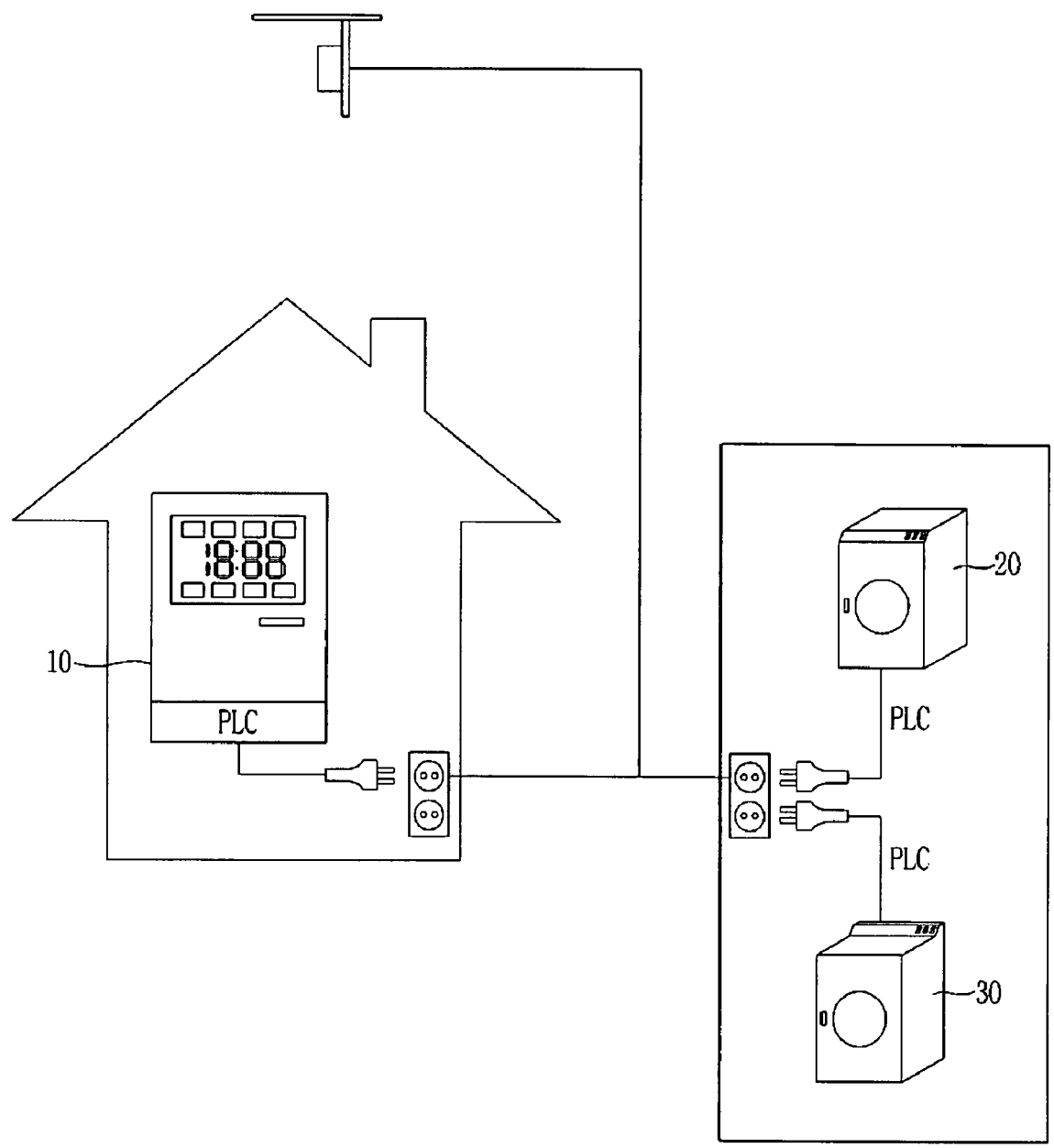
FIG. 1 is a structure view illustrating a conventional monitoring system.
Figure 2:
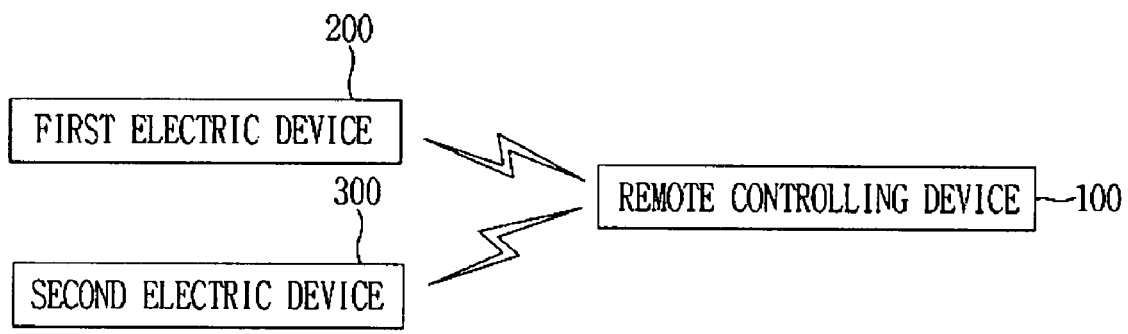
FIG. 2 is a concept view illustrating a remote controlling system for an electric device in accordance with the present invention.

FIG. 2 is a concept view illustrating the remote controlling system for the electric device in accordance with the present invention. As illustrated in FIG. 2, the remote controlling system for the electric device includes a first electric device 200 and a second electric device 300 for performing predetermined operations, respectively, and a remote controlling device 100 for displaying current operation states or current states of the first and second electric devices 200 and 300 and controlling the first and second electric devices 200 and 300, by performing data communication with the first and second electric devices 200 and 300 by wireless communication, respectively.

Here, the first electric device 200 and the second electric device 300 are devices which can perform individual functions (for example, washer function, dryer function, microwave oven function, etc.) by a direct input of the user, and which can process data according to a state request command or an operation control command from the remote controlling device 100. For instance, the first electric device 200 and the second electric device 300 can be a washer, a dryer, a microwave oven, a refrigerator, an air conditioner and a television which can perform wireless communication. Especially, the present invention is more efficient in the electric devices installed slightly far from the user for performing predetermined operations for a predetermined time, such as the washer and the dryer.

The remote controlling device 100 displays states of one or more electric devices which can perform wireless communication, such as the first electric device 200 and the second electric device 300, and controls the electric devices. The wireless communication is communication using industrial scientific medical (ISM) band. The remote controlling device 100 can be an electric device which displays the states of the first electric device 200 and the second electric device 300 and controls the first electric device 200 and the second electric device 300, or an electric device which performs an individual function like the first electric device 200 and the second electric device 300 and further performs the state display and control functions.

Figure 3:
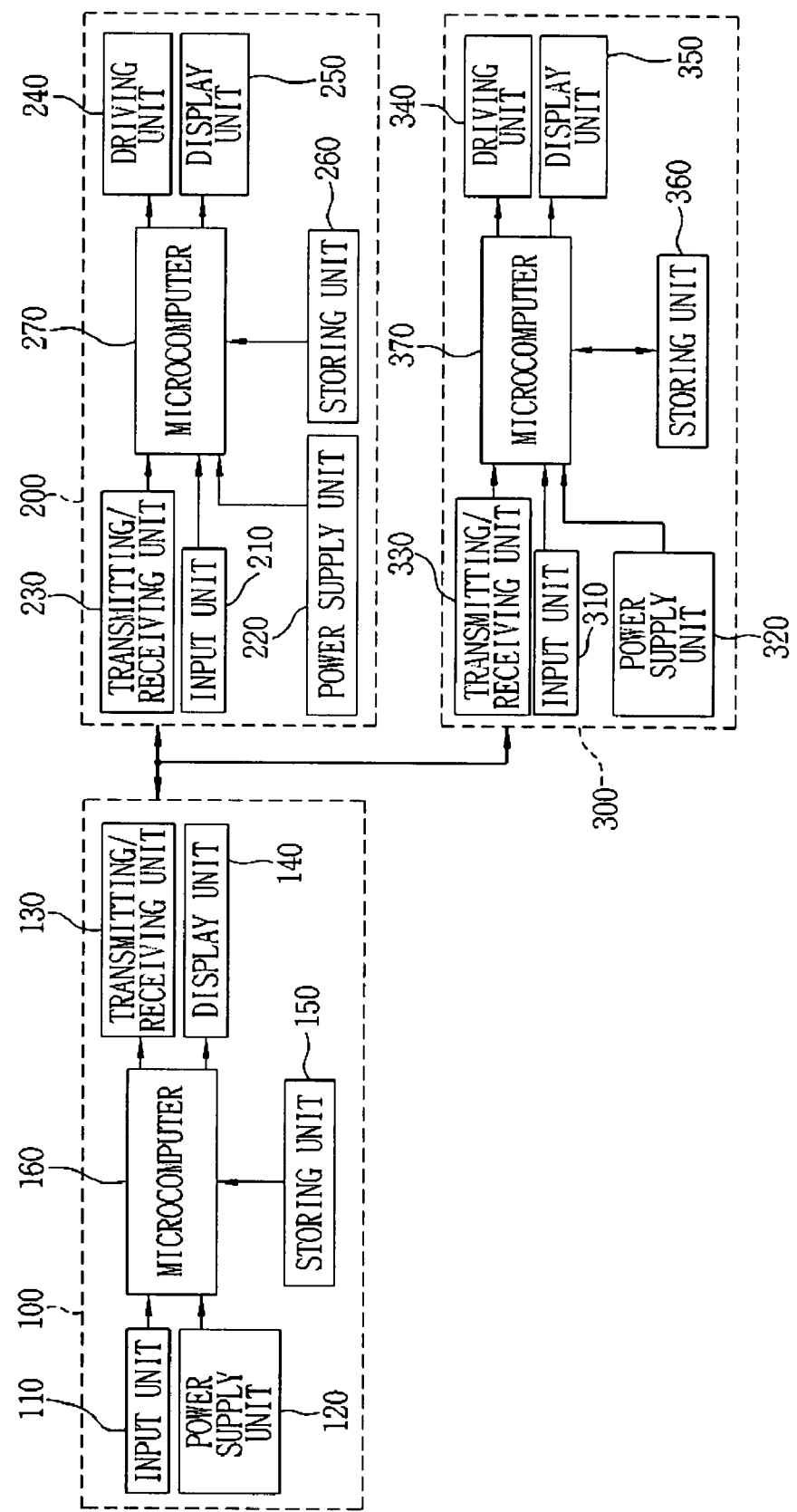
FIG. 3 is a detailed structure view illustrating each electric device and a remote controlling device of FIG. 2.

FIG. 3 is a detailed structure view illustrating each electric device and the remote controlling device of FIG. 2.

The remote controlling device 100 includes an input unit 110 for acquiring an input from the user, a power supply unit 120 for supplying the whole power, a transmitting/receiving unit 130 for performing wireless communication with the first electric device 200 and the second electric device 300, a display unit 140 for displaying the states of at least the first electric device 200 and the second electric device 300, a storing unit 150 for storing reference information for converting the input of the user into a predetermined command, and other user set information, and a microcomputer 160 for displaying the state of the first electric device 200 or the second electric device 300 and controlling the first electric device 200 or the second electric device 300 according to the input from the user, by controlling the aforementioned elements.

In detail, the input unit 110 acquires an electric device selection input, a state request input and an operation control input from the user. The input unit 110 can be formed in a button type, touch pad type or touch screen type. The electric device selection input is inputted when the user intends to display the state of the electric device or control the operation of the electric device. The state request input is inputted to request the state of the electric device selected or previously set (for example, as default) by the user. The electric device selection input and the state request input can be independent inputs. Also, the electric device selection input can include the state request input. Here, when the user inputs the electric device selection input, the state request input is automatically selected to request the state of the electric device.

The power supply unit 120 supplies power to be consumed in the remote controlling device 100. The power supply unit 120 receives power from a common power source (AC power source), performs rectification, smoothing and transformation inside, and supplies a required voltage to each element of the remote controlling device 100. Accordingly, the power supply unit 120 includes a rectification and smoothing element and a transformation means, but explanations thereof are omitted. As the power supply unit 120 is supplied with common power, the movement of the remote controlling device 100 is restricted within the range of common power supply. However, the remote controlling device 100 using the wireless communication has mobility, even though it is limitative. Particularly, the power supply unit 120 is controlled by the microcomputer 160 discussed later, and turned on or off to cut the power supply.

The transmitting/receiving unit 130 transmits and receives data by wireless communication with the first electric device 200 and the second electric device 300, especially performs ISB communication. Generally, the transmitting/receiving unit 130 is comprised of an antenna, a modulator, a demodulator, an amplifier and a filter. However, detailed explanations thereof are omitted.

The display unit 140 displays the selection state, the state information and the control information of the first electric device 200 and the second electric device 300. The display unit 140 includes an audible display unit and a visible display unit. That is, the audible display unit provides information to the user by sound, such as a speaker, and the visible display unit provides information to the user by light and color, such as an LED display.

The storing unit 150 stores at least the reference information for generating a command corresponding to the input of the user, and deciding the state of the electric device. The reference information includes information for converting a specific input of the user into a machine language recognizable by the first electric device 200 and the second electric device 300 in order to display the state of the electric device or control the operation thereof according to the input, and information for deciding a specific state (for example, an incontrollable state) of the electric device. In addition, the storing information 150 stores the set information of the user. The set information includes information on the electric device firstly selected when the remote controlling device 100 is turned on, and information on a method (automatic display, delay display, etc. discussed later) for displaying a specific event (error information, operation end information, etc.). Moreover, the storing unit 150 stores display priority of the received state information, the operation control input of the user, the error information, the operation end information and the state information. The storing unit 150 also stores a user interface for controlling detailed operations of each electric device 100 and 200. The user interface enables the user to select/input commands for controlling the operations of each electric device 200 and 300.

The microcomputer 160 controls the above-described elements, for displaying the state or controlling the operation according to the electric device selection input, the state request input and the operation control input of the user. The functions of the microcomputer 160 will later be explained in detail with reference to FIGS. 8 to 11.

The first electric device 200 includes an input unit 210 for acquiring a control input from the user, a power supply unit 220 for supplying power, a transmitting/receiving unit 230 for performing wireless communication, a driving unit 240 for performing an individual function of the first electric device 200, a display unit 250 for displaying the state or operation control of the first electric device 200, a storing unit 260 for storing operation information, control information and set information corresponding to the individual function of the first electric device 200, and a microcomputer 270 for performing communication with the remote controlling device 100, transmitting the state information according to the state request command, receiving the operation control command, performing a corresponding operation, transmitting the error information when an error occurs, transmitting the operation end information after operation control, and transmitting proceeding information of the detailed operation state (state information which does not relate to the state request command), by controlling the aforementioned elements.

Particularly, the microcomputer 270 basically performs the function of the first electric device 200, and additionally responds to the state request command received through wireless communication, executes the operation control command, and transmits the error information, the operation end information and the independent state information to the remote controlling device 100.

An input unit 310, a power supply unit 320, a transmitting/receiving unit 330, a driving unit 340, a display unit 350, a storing unit 360 and a microcomputer 370 of the second electric device 300 correspond to the input unit 210, the power supply unit 220, the transmitting/receiving unit 230, the driving unit 240, the display unit 250, the storing unit 260 and the microcomputer 270 of the first electric device 200. However, the driving unit 340 performs an individual function of the second electric device 300.

Figure 4:
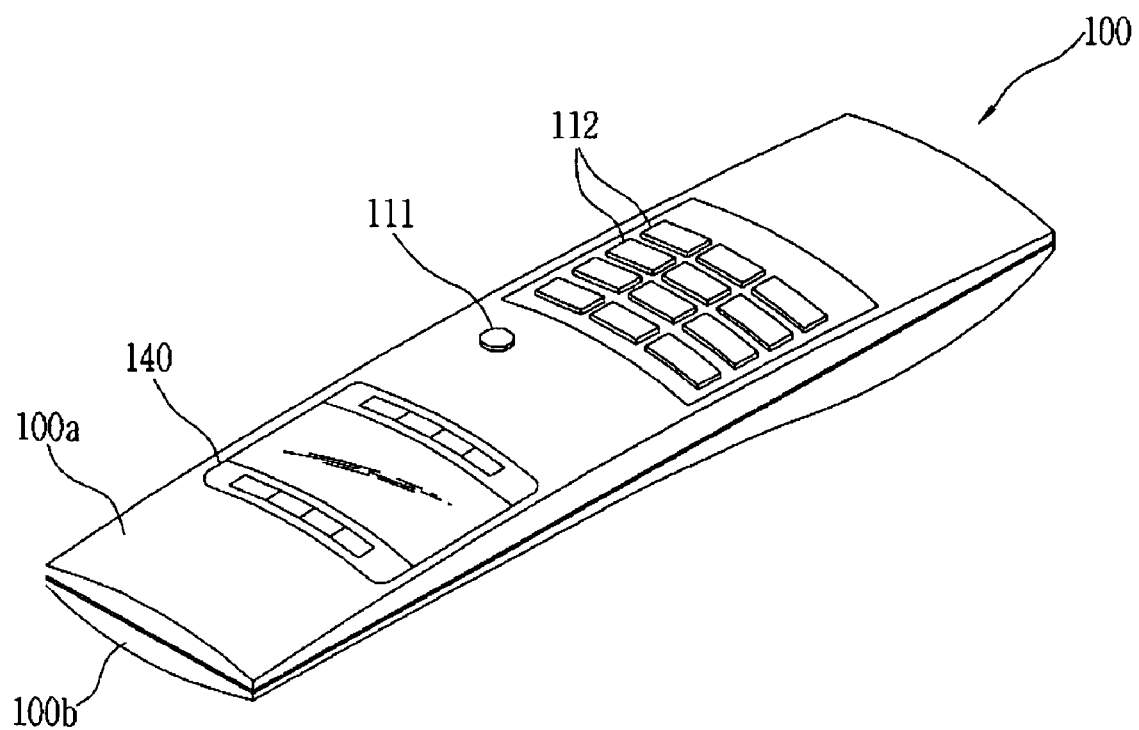
FIG. 4 is a perspective view illustrating one example of the remote controlling device of FIG. 2.

FIG. 4 is a perspective view illustrating one example of the remote controlling device of FIG. 2. The remote controlling device 100 includes an upper casing 101 partially exposing the top surfaces of the display unit 140 and the input unit 110 (111 denotes an input unit for the electric device selection/the state request input, and 112 denotes an input unit for the detailed operation control input), and a lower casing 102 coupled to the upper casing 101, for protecting inside circuit boards, etc. Also, shown are a plug 121 connected to an external plug socket and supplied with common power, and a power line 122 for applying common power from the plug 121 to the power supply unit 120. The front surface 100a of the remote controlling device 100 contains a metallic material to improve the external appearance or prevent abrasion. For example, it can be coated with an aluminum thin film.

Figure 5:
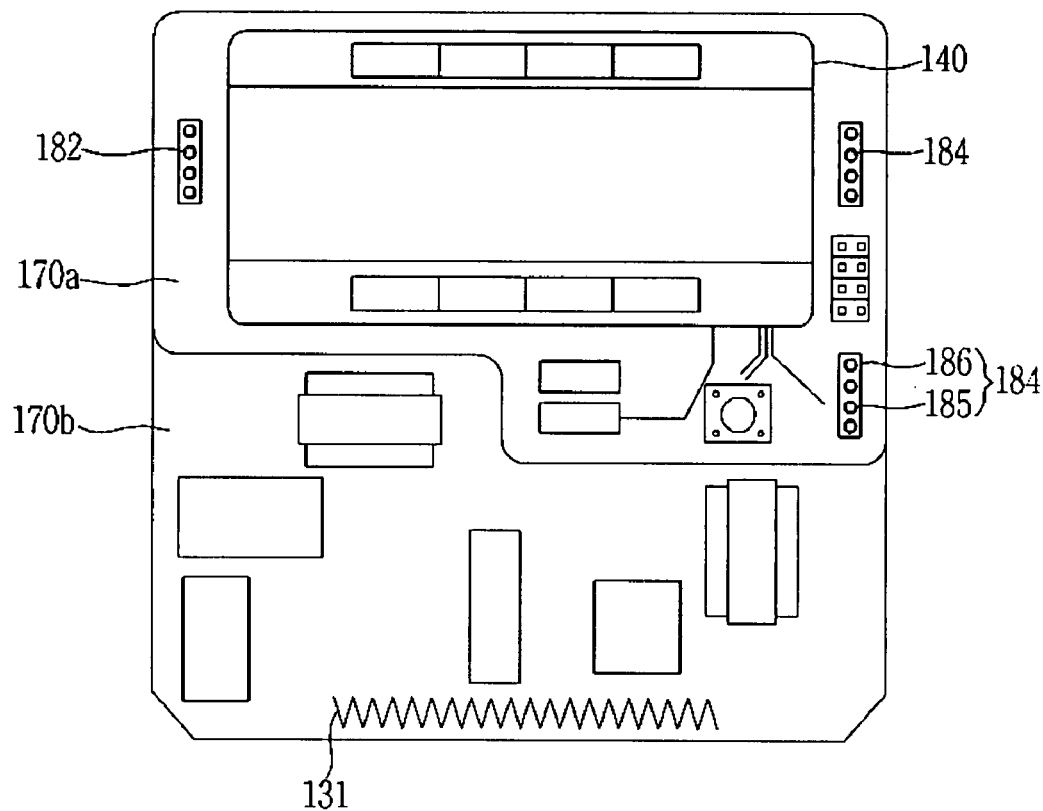
FIGS. 5 to 7 are partially exploded views illustrating the remote controlling device of FIG. 2.
Figure 6:
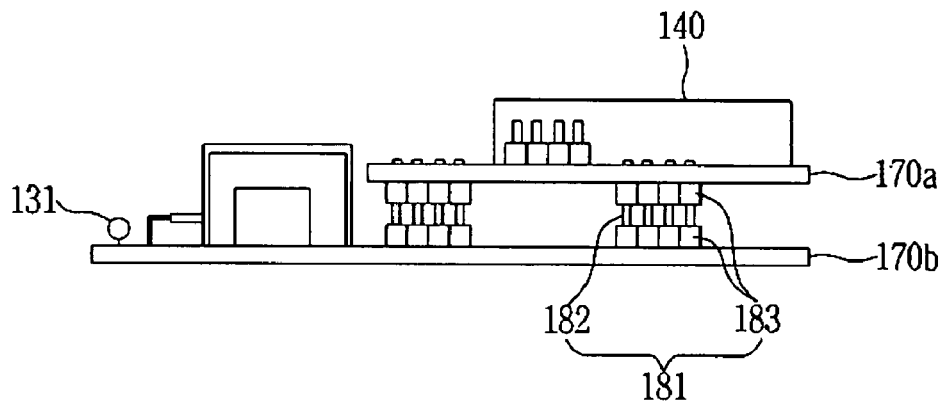
Figure 7:
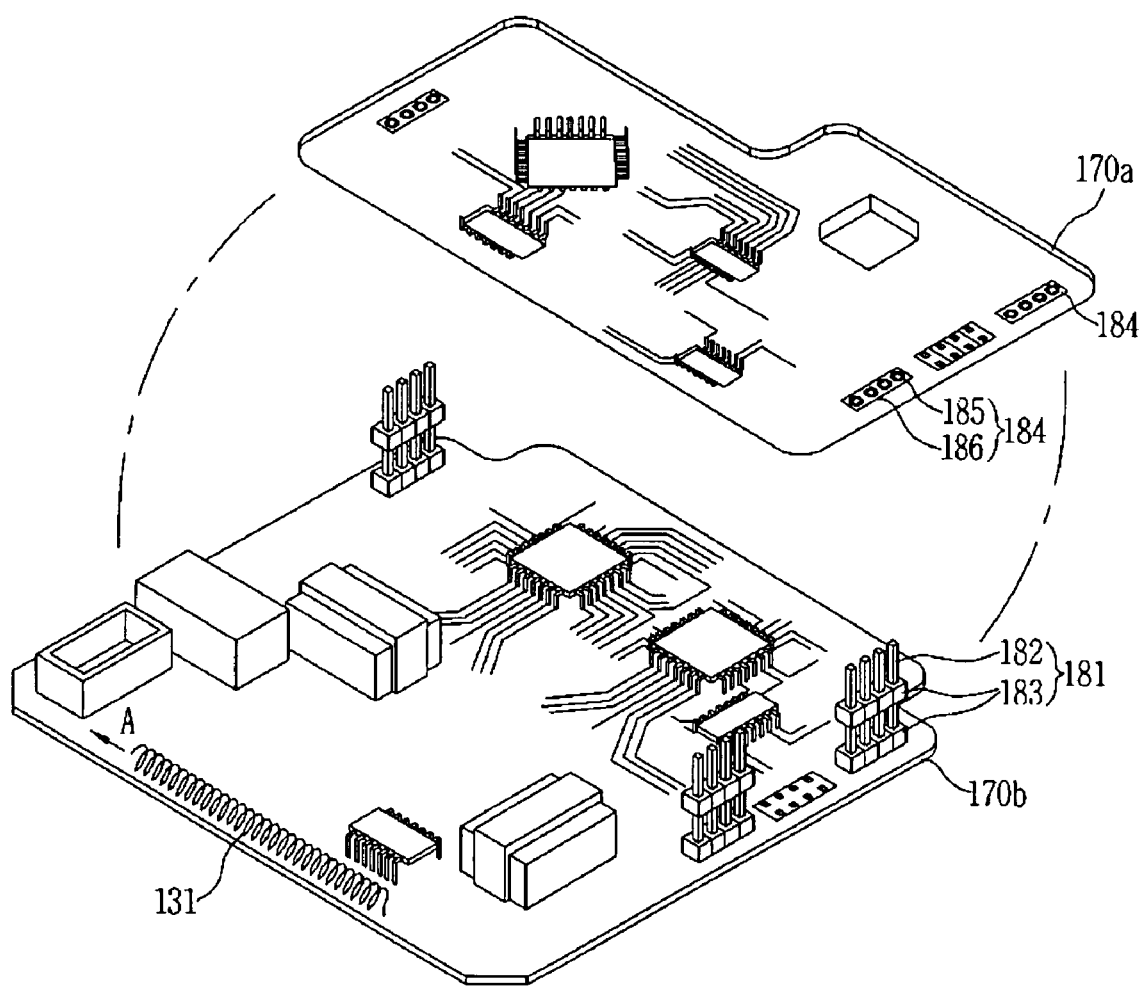

FIGS. 5 to 7 are partially exploded views illustrating the remote controlling device of FIG. 2.

The remote controlling device 100 has a laminated structure by coupling a first circuit board 170a and a second circuit board 170b by connectors 181 and 184. The laminated structure occupies the minimum capacity in the upper and lower casings 101 and 102 of the remote controlling device 100. In the production and repair, the first and second circuit boards 170a and 170b can be easily disconnected from each other.

In this embodiment, the input unit 110 and 111, the display unit 140, the storing unit 150 and the microcomputer 160 are mounted on the first circuit board 170a, and the power supply unit 120 and the transmitting/receiving unit 130 are mounted on the second circuit board 170b. The input unit 112 of FIG. 4 is mounted inside the upper casing 101, and connected to the first circuit board 170a through a conductive line with its buttons externally exposed. In addition, as the inside elements of the power supply unit 120 for supplying power to the remote controlling device 100 are relatively large, the power supply unit 120 is preferably mounted on the second circuit board 170b. However, the power line 122 is not illustrated in FIGS. 5 to 7.

Especially, as various elements of the transmitting/receiving unit 130 are relatively larger than the other elements, the transmitting/receiving unit 130 is mounted on not the first circuit board 170a but the second circuit board 170b. Still referring to the above figures, an antenna 131 of the transmitting/receiving unit 130 is provided as a conductive line mounted in a loop shape so as to have high reception of wireless signals. One end of the antenna 131 is electrically connected to the second circuit board 170b, for transmitting and receiving the wireless signals. The conductive line of the antenna 131 is placed in the loop shape along the peripheral portion of the second circuit board 170b. The antenna 131 is fixedly mounted on the second circuit board 170b, so that the antenna 131 does not contact the other elements or the first circuit board 170a in movement or vibration of the remote controlling device 100. Particularly, the installation position of the antenna 131 is dependent upon high reception. If the front surface 100a of the upper casing 101 contains a metallic material, the wireless signals are hardly receivable. Therefore, as shown in FIG. 6, the second circuit board 170b is fixed to correspond to the side of the remote controlling device 100, so that the antenna 131 maintains high reception of the wireless signals.

The connectors 184 each respectively including a plurality of terminal holes 185 and a rand 186 formed by plating the peripheral regions of the terminal holes 185 are formed on the first circuit board 170a, and the connectors 181 each respectively including a plurality of conductive lead pins 182 vertically extended in the upward direction and electrically connected by inserting their ends into the terminal holes 185, and a pair of insulative spacer molds 183 fixed to the lead pins 182 with a predetermined interval are formed on the second circuit board 170b.

The insulative spacer molds 183 of the connectors 181 contact the first circuit board 170a and the second circuit board 170b, respectively, maintain a constant interval between the first and second circuit boards 170a and 170b, and obtain an insulation distance between the first and second circuit boards 170a and 170b.

The connectors 181 and 184 electrically connect the first circuit board 170a and the second circuit board 170b, and carry out, for example, power supply, grounding or data transmission.

Figure 8:
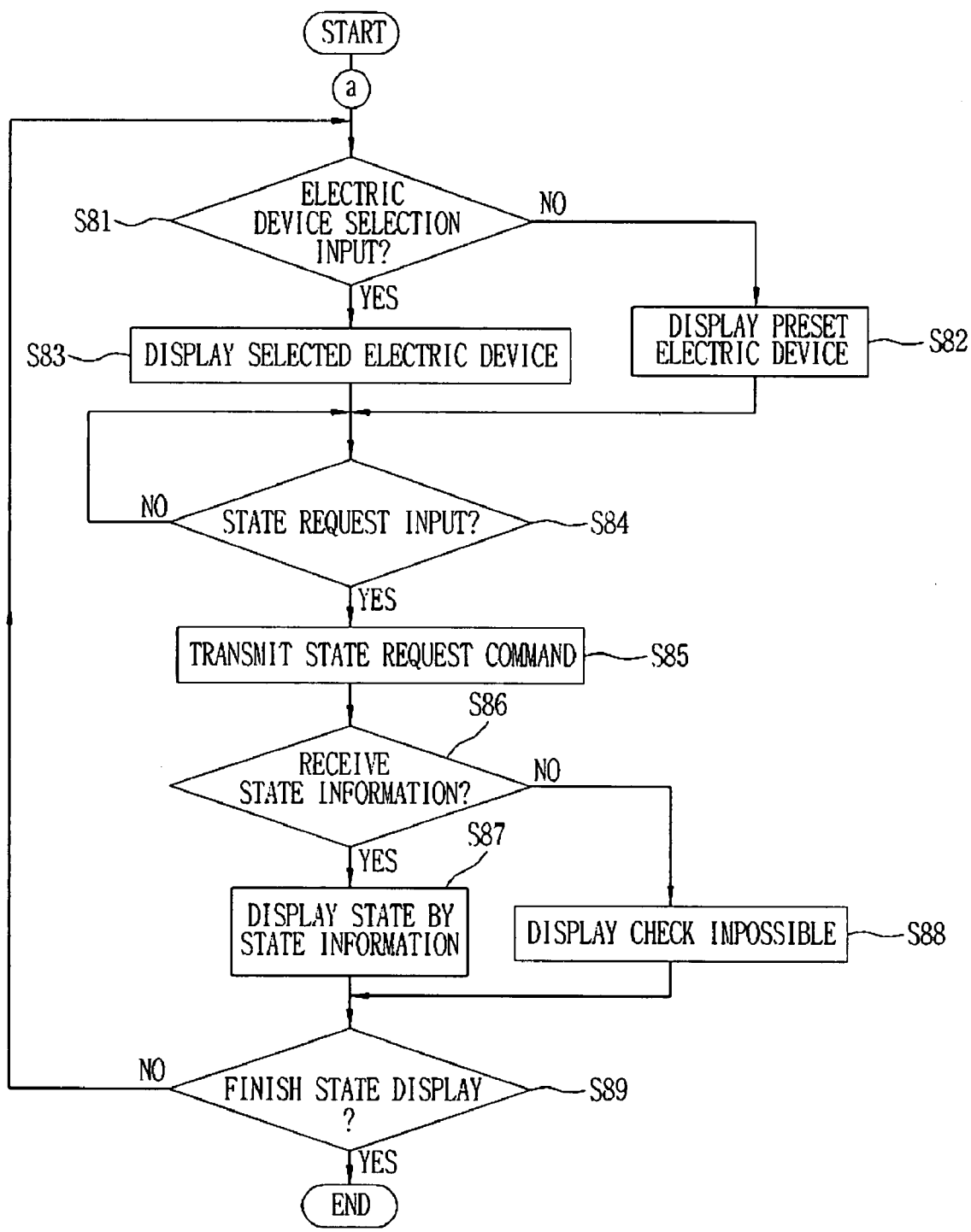
FIG. 8 is a flowchart showing sequential steps of a remote controlling method in accordance with a first embodiment of the present invention.

FIG. 8 is a flowchart showing sequential steps of a remote controlling method in accordance with a first embodiment of the present invention.

In detail, in step S81, the microcomputer 160 of the remote controlling device 100 decides whether electric device selection has been inputted through the input unit 110. If so, the microcomputer 160 goes to step S83, and if not, the microcomputer 160 goes to step S82.

In step S82, the microcomputer 160 reads the set information stored in the storing unit 150, and displays the preset electric device on the display unit 140 for state display or operation control. Here, the microcomputer 160 can simply display the name or icon of the preset electric device.

In step S83, the microcomputer 160 displays the electric device corresponding to the selection input from the input unit 110 on the display unit 140 in the same manner as that of step S82.

In step S84, the microcomputer 160 decides whether the state request for the selected or preset electric device has been inputted through the input unit 110.

In step S85, the microcomputer 160 reads the reference information of the storing unit 150 according to the state request input, generates the state request command on the basis of the reference information, and transmits the state request command through the transmitting/receiving unit 130. Therefore, the first electric device 200 and the second electric device 300 receive the state request command through their transmitting/receiving units 230 and 330, respectively. The microcomputers 270 and 370 of the first and second electric devices 200 and 300 corresponding to the state request command transmit the current state information of the first and second electric devices 200 and 300 through the transmitting/receiving units 230 and 330.

In step S86, the microcomputer 160 checks whether the state information has been inputted. For this, the microcomputer 160 can maintain a standby state for a predetermined time. If the state information has been inputted, the microcomputer 160 goes to step S87, and if not, the microcomputer 160 goes to step S88.

In step S87, the microcomputer 160 displays the state information. The state information relates to the state of the electric device. In the state display, the proceeding state of the operation of the electric device is displayed in the form of characters, figures and sound.

In step S88, the microcomputer 160 has not received the state information. Because the microcomputer 160 cannot check the state of the electric device corresponding to the state request command due to an off state of the electric device or an error of the transmitting/receiving unit, it displays 'check impossible' (or communication impossible).

In step S89, if the microcomputer 160 receives the state display end through the input unit 110, the microcomputer 160 finishes the procedure. If not, the microcomputer 160 continuously displays the state of the electric device.

Here, steps S82 and S83 include steps S84 and S85, so that the user can use the display service below step S86 without making an additional state request. That is, if the electric device selection input is inputted in step S81, the microcomputer 160 sequentially displays the selected electric device and generates and transmits the state request command in step S83. The microcomputer 160 is operated in the same manner in step S82.

In step S81, the microcomputer 160 can receive a plurality of electric device selection inputs. In this case, the microcomputer 160 displays the plurality of electric devices in step S83, processes the state request input for one electric device in step S84, and displays the state information of the electric device on the display unit 140.

In this embodiment, it is also possible to select and display the plurality of electric devices.

Figure 9:
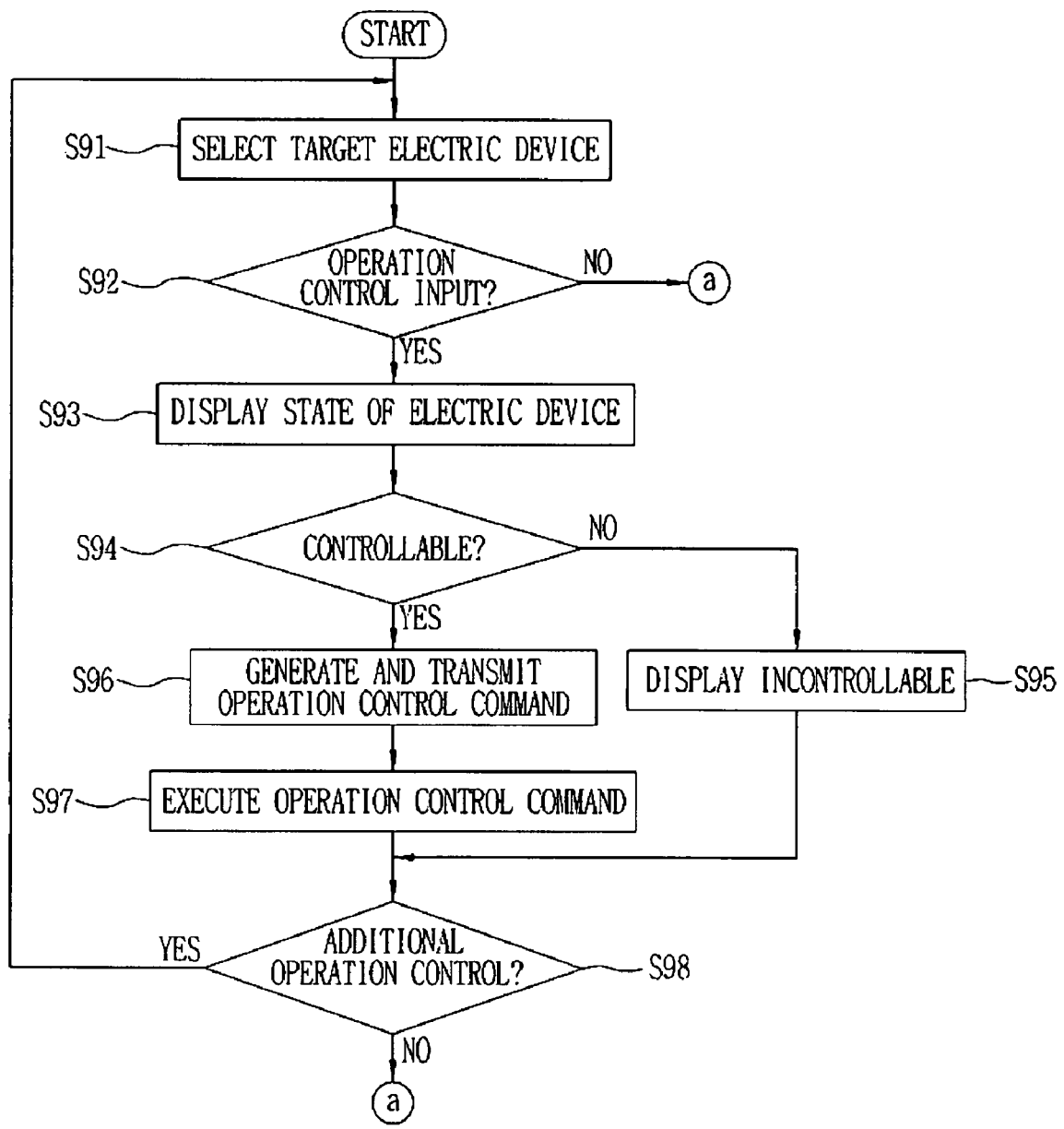
FIG. 9 is a flowchart showing sequential steps of a remote controlling method in accordance with a second embodiment of the present invention.

FIG. 9 is a flowchart showing sequential steps of a remote controlling method in accordance with a second embodiment of the present invention.

In detail, in step S91, the microcomputer 160 acquires the electric device selection input from the input unit 110. In step S91, if the microcomputer 160 controls the operation of the electric device whose current state is displayed, this selection step is not required.

In step S92, the microcomputer 160 acquires the operation control input for the selected electric device from the input unit 110. If the microcomputer 160 does not acquire the operation control input, the microcomputer 160 decides that the user wants state display, and goes to ⓐ of FIG. 8 to display the state of the electric device. If the microcomputer 160 acquires the operation control input, it goes to step S93. In step S92, the microcomputer 160 can read the user interface from the storing unit 150 and display it on the display unit 140, so that the user can easily select and input the operation control input.

In step S93, the microcomputer 160 preferentially displays the state of the electric device corresponding to the operation control input. This display step is performed prior to step S92. Therefore, when the user inputs the operation control input, the user can precisely recognize the current state of the electric device and appropriately input the operation control input.

In step S94, the microcomputer 160 decides whether the corresponding electric device can control the operation according to the operation control input. For example, when the operation control input is washing, the microcomputer 160 decides 'control impossible' if the electric device corresponding to washing is in an off state, and decides 'control possible' if the electric device is in a standby state. Accordingly, the microcomputer 160 does not generate and transmit an unnecessary operation control command.

In step S95, the microcomputer 160 displays 'control impossible' on the display unit 140 to notify that the electric device corresponding to the operation control command cannot execute the command.

In step S96, the microcomputer 160 generates the operation control command corresponding to the operation control input on the basis of the reference information, and transmits the operation control command through the transmitting/receiving unit 130.

In step S97, the first electric device 200 and the second electric device 300 receive the operation control command through their transmitting/receiving units 230 and 330, respectively. The microcomputers 270 and 370 of the first and second electric devices 200 and 300 corresponding to the operation control command control the operations according to the operation control command. Here, the microcomputer 270 or 370 can transmit the operation control result to the remote controlling device 100 through the transmitting/receiving unit 230, and the remote controlling device 100 can display the operation control result.

In step S98, the microcomputer 160 checks whether an additional operation control input has been inputted by the user through the input unit 110. If the additional operation control is necessary, the microcomputer 160 goes to step S91, and if not, the microcomputer 160 goes to (a) of FIG. 8 to continuously display the state of the electric device.

In the above embodiment, step S93 can be performed between steps S91 and S92, and step S92 can be performed between steps S94 and S96.

Figure 10:
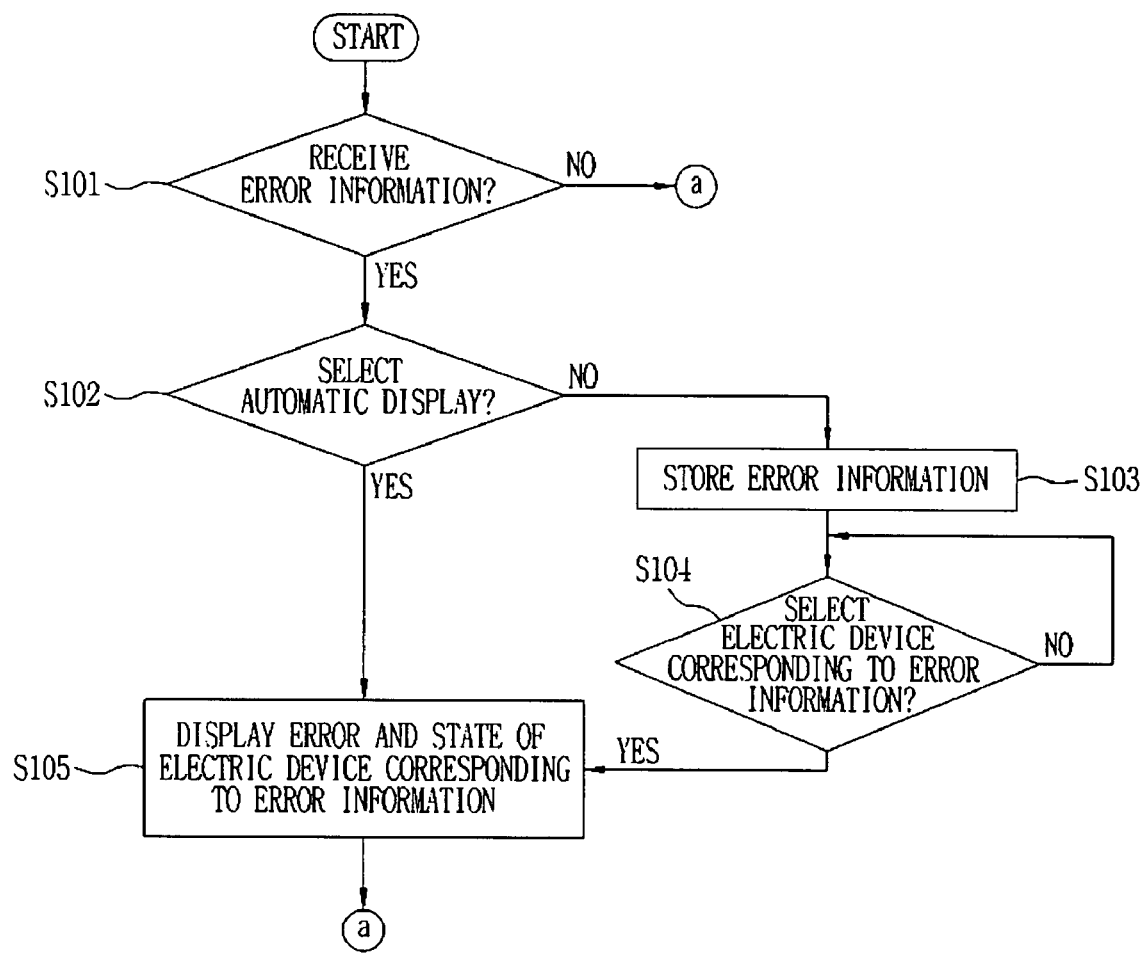
FIG. 10 is a flowchart showing sequential steps of a remote controlling method in accordance with a third embodiment of the present invention.

FIG. 10 is a flowchart showing sequential steps of a remote controlling method in accordance with a third embodiment of the present invention.

In detail, in step S101, the microcomputer 160 decides whether the error information has been inputted through the transmitting/receiving unit 130. If so, the microcomputer 160 goes to step S102, and if not, the microcomputer 160 goes to (a) of FIG. 8 to continuously display the state of the electric device. The error information is generated by independent decision of the first electric device 200 or the second electric device 300, and transmitted to the remote controlling device 100.

In step S102, the microcomputer 160 reads the set information stored in the storing unit 150. The set information relates to display of the error information, and includes an automatic display method for automatically displaying the error information regardless of electric device selection of the user, and a display method for displaying the error information when the user selects the electric device corresponding to the error information. If the automatic display method has been set, the microcomputer 160 goes to step S105, and if not, the microcomputer 160 goes to step S103.

In step S103, the microcomputer 160 stores the error information in the storing unit 150.

In step S104, the microcomputer 160 decides whether the electric device corresponding to the error information stored in the storing unit 150 has been selected through the input unit 110. If so, the microcomputer 160 goes to step S105.

In step S105, the microcomputer 160 displays the received or stored error information on the display unit 140. Here, the microcomputer 160 can also display the state of the electric device corresponding to the error information.

Figure 11:
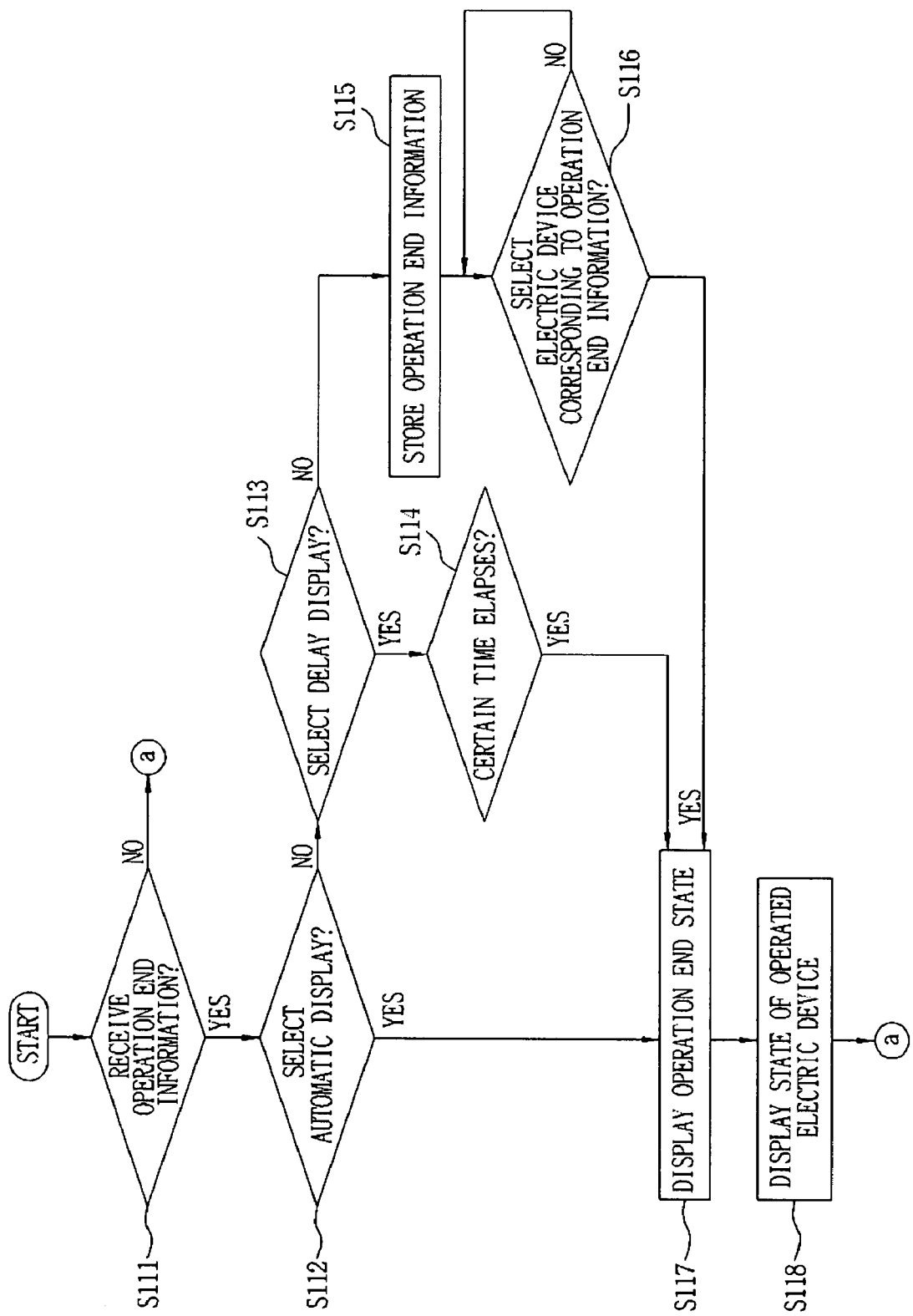
FIG. 11 is a flowchart showing sequential steps of a remote controlling method in accordance with a fourth embodiment of the present invention.

FIG. 11 is a flowchart showing sequential steps of a remote controlling method in accordance with a fourth embodiment of the present invention.

In detail, in step S111, the microcomputer 160 decides whether the operation end information has been inputted through the transmitting/receiving unit 130. If so, the microcomputer 160 goes to step S112. If not, the microcomputer 160 goes to (a) of FIG. 8 to continuously display the state of the electric device. Here, the operation end information is information transmitted after the first and second electric devices 200 and 300 complete predetermined operations (for example, sub operations or whole operations). For example, when the first and second electric devices 200 and 300 are washers, if the washers end washing and are turned off after a predetermined time by power interception, the washers need to notify the washing end state (namely, operation end state) to the remote controlling device 100 before power interception.

In step S112, the microcomputer 160 reads the set information stored in the storing unit 150. The set information relates to display of the operation end information, and includes an automatic display method for automatically displaying the operation end information without delay, a delay display method for displaying the operation end information after a predetermined time (for example, at a power interception time), and a selection display method for displaying the operation end information when the user selects the electric device corresponding to the operation end information. If the automatic display method has been set, the microcomputer 160 goes to step S117, and if not, the microcomputer 160 goes to step S113.

In step S113, the microcomputer 160 reads the set information stored in the storing unit 150 again. If the delay display method has been set, the microcomputer 160 goes to step S114, and if the selection display method has been set, the microcomputer 160 goes to step S115.

In step S114, the microcomputer 160 maintains a standby state for a predetermined time, and goes to step S117.

In step S115, the microcomputer 160 stores the operation end information in the storing unit 150.

In step S116, the microcomputer 160 decides whether the electric device corresponding to the operation end information stored in the storing unit 150 has been selected through the input unit 110. If so, the microcomputer 160 goes to step S117.

In step S117, the microcomputer 160 displays the operation end information on the display unit 140, such as the name, icon and ended operation of the corresponding electric device.

In step S118, the microcomputer 160 deletes display of the electric device corresponding to the operation end information, and displays the state of the electric device performing the operation. If the current selected electric device ends the operation, the microcomputer 160 displays the state of the non-selected or preset electric device. Thereafter, the microcomputer 160 goes to (a) of FIG. 8 to continuously display the state of the electric device.

Figure 12:
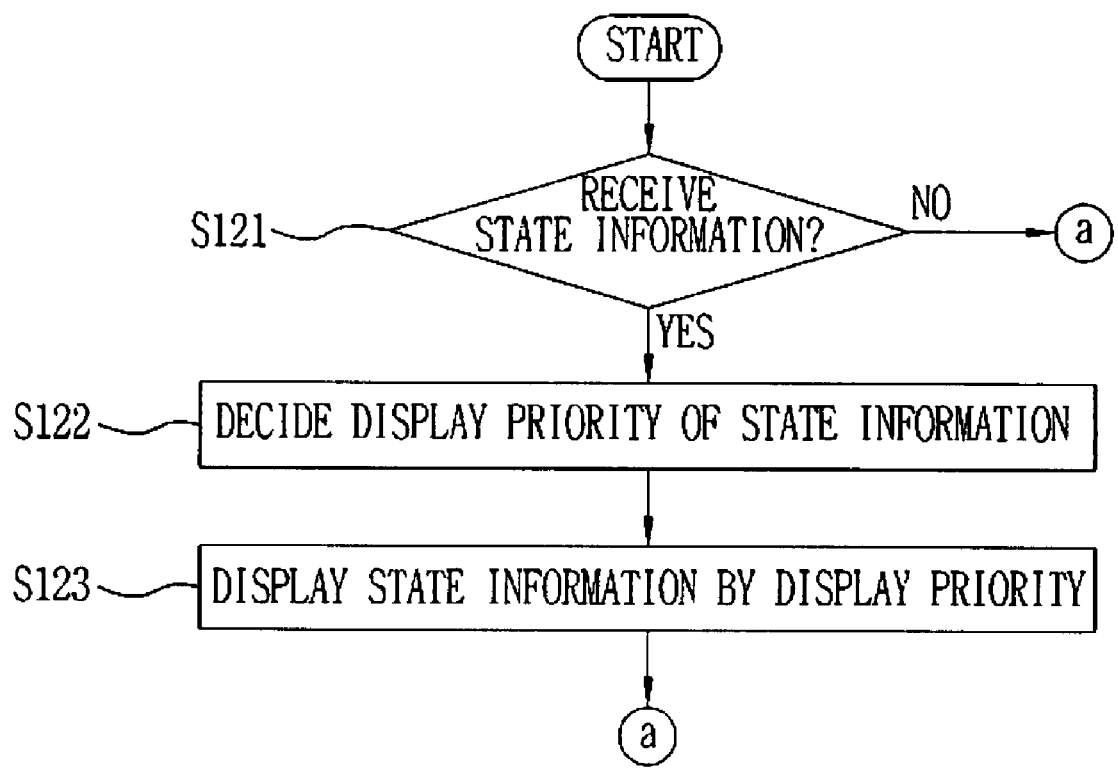
FIG. 12 is a flowchart showing sequential steps of a remote controlling method in accordance with a fifth embodiment of the present invention.

FIG. 12 is a flowchart showing sequential steps of a remote controlling method in accordance with a fifth embodiment of the present invention.

In detail, in step S121, the microcomputer 160 decides whether the state information has been inputted through the transmitting/receiving unit 130. If so, the microcomputer 160 goes to step S122, and if not, the microcomputer 160 goes to (a) of FIG. 8. In step S121, the microcomputer 160 has not generated the state request command for the state information before receiving the state information. That is, the first electric device 200 and the second electric device 300 have individually generated and transmitted the state information. The state information includes the error information and the operation end information, and can further include the current operation state.

In step S122, the microcomputer 160 decides display priority of the state information. The display priority is included in the reference information stored in the storing unit 150. The display priority is a display order set by the user or the manufacturer.

The display priority includes top priority of display of the electric device selection of the user, top priority of display of the operation state, top priority of display of the error information, and top priority of display of the operation end information. For example, when the electric device selection of the user has top priority (the embodiment shown in FIG. 8), the microcomputer 160 displays only the state information corresponding to the electric device selected by the user.

When the operation state has top priority, while the microcomputer 160 displays the electric device selected by the user, if the microcomputer 160 receives information on the operation state (for example, operation start, specific operation end, etc.) of another electric device, the microcomputer 160 displays the operation state of another electric device on the display unit 140. In detail, when the first electric device 200 and the second electric device 300 are in a standby power state, even if the user selects the first electric device 200, if the second electric device 300 starts the drying operation and transmits the drying operation state to the remote controlling device 100, the microcomputer 160 preferentially displays the operation state of the second electric device 300 on the display unit 140.

According to the display priority, the user or the manufacturer can variously conduct the state display of the electric devices corresponding to each need.

In step S123, the microcomputer 160 displays the received state information on the display unit 140 according to the display priority. After the display based on the display priority, the microcomputer 160 can re-conduct the state display of the electric device selected by the user.

In the above-described embodiment of FIG. 12, the microcomputer 160 displays a user interface on the display unit 140 so that the user can set or reset the display priority stored in the storing unit 150. That is, the microcomputer 160 can perform the setting or resetting step so that the user or the manufacturer can arbitrarily select or combine the display priority.

FIGS. 13 to 17 are exemplary views illustrating display examples by the remote controlling method in accordance with the present invention.

Figure 13:
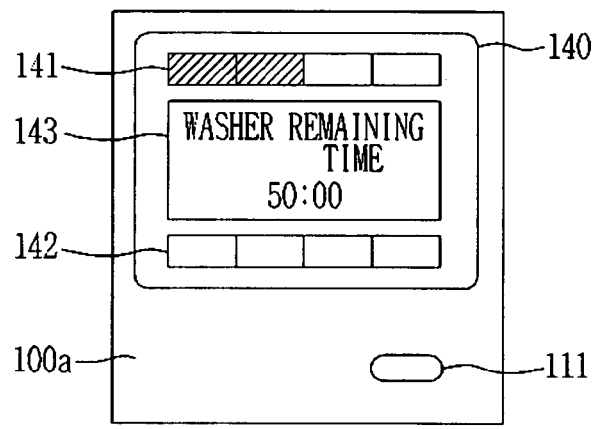
FIGS. 13 to 17 are exemplary views illustrating display examples by the remote controlling method in accordance with the present invention.

In FIG. 13, the microcomputer 160 acquires the electric device selection input of the user through the input unit 111 or displays the preset electric device. The state information of the current displayed electric device is 'washer, remaining time 50 minutes'. Here, figures are displayed through first and second display units 141 and 142, and characters are displayed through a third display unit 143.

Figure 14:
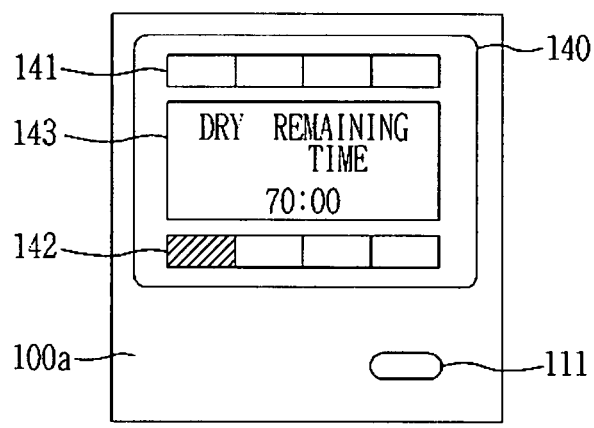

In FIG. 14, when the user requests the state information of the dryer by pressing the input unit 111 in the state of FIG. 13, the microcomputer 160 displays the state information of the dryer, 'dryer, remaining time 70 minutes'.

In FIGS. 13 and 14, the microcomputer 160 displays the current states of the electric devices through the first display unit 141 and the second display unit 142, respectively.

Figure 15:
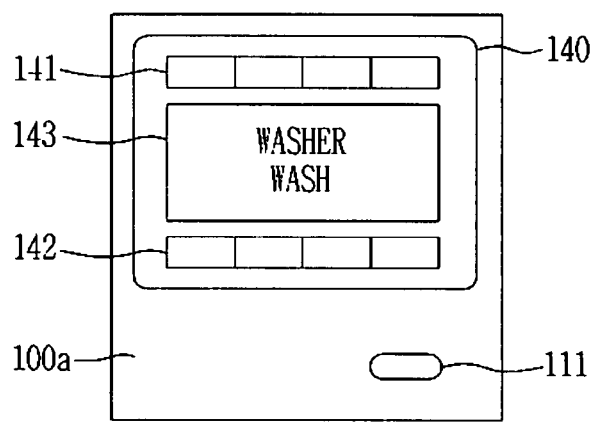

In FIG. 15, the microcomputer 160 shows the process for acquiring the operation control input from the user. Here, the wash command for the washer acquired from the user is displayed on the display unit 140. As any operation is not yet started, the first and second display units 141 and 142 do not display anything.

Figure 16:
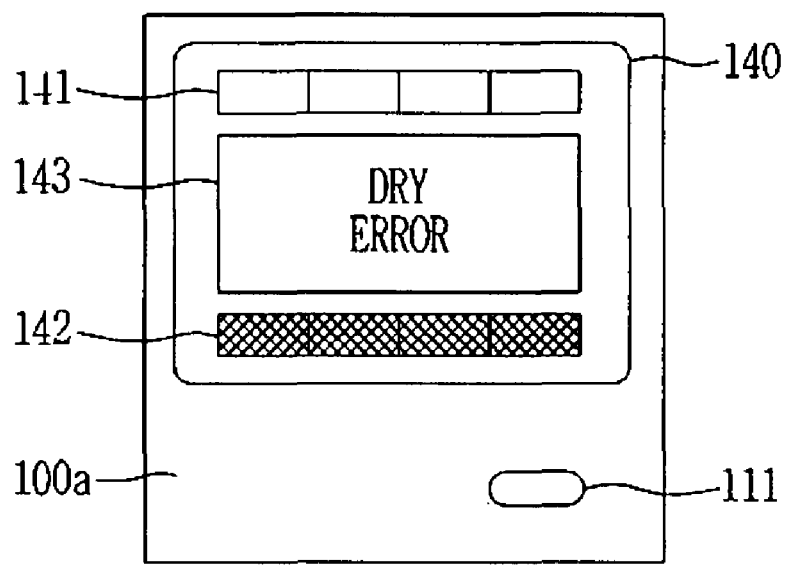

In FIG. 16, the microcomputer 160 displays 'dry error' on the third display unit 143 by the automatic display method or the electric device selection input of the user, and makes the second display unit 142 flickered to call the user's attention. In addition, an alarm can be generated for audible display.

Figure 17:
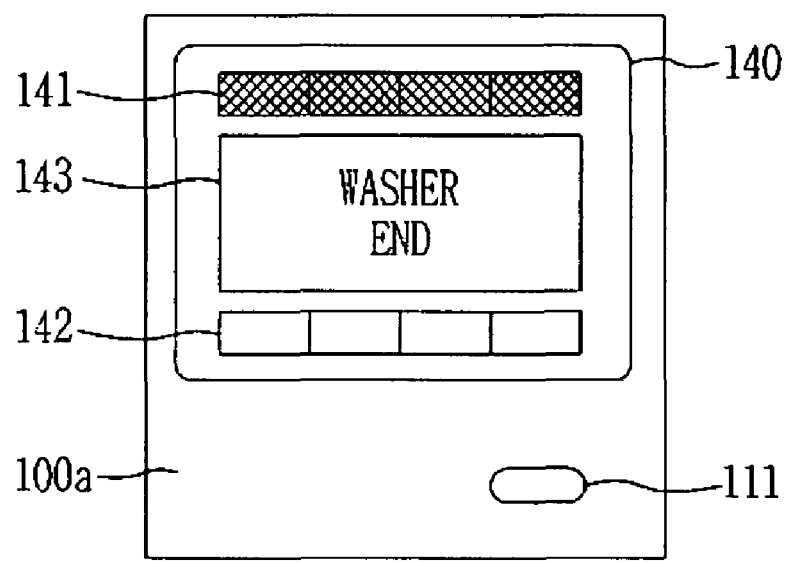

In FIG. 17, the microcomputer 160 displays 'washer end' on the third display unit 143 by the automatic display method, the delay display method or the user selection method, and makes the first display unit 141 flickered to call the user's attention. Also, an alarm can be generated for audible display.

As discussed earlier, in accordance with the present invention, the states of the electric devices such as the washer and the dryer are displayed and the operations thereof are controlled by selection of the user.

The states of the electric devices are displayed before the operations thereof are controlled, so that the user can check the states of the electric devices and control the operations thereof. It is thus possible to prevent a request for executing an unnecessary or incontrollable operation control command.

In addition, the capacity of the whole components is reduced and reception of the signals is improved.

Mobility of the user is guaranteed, so that the user can conduct the state check and the operation control within the circular range which the wireless signals reach.

Moreover, generation of the events is displayed according to the display priority. Therefore, the display operation is carried out by various requests of the user.

Furthermore, the remote controlling device using common power is provided to stably display the states of the electric devices and control the operations thereof.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A remote controlling system for an electric device, comprising:
    one or more electric devices for communicating with a remote controller through a wireless communication network, the one or more electric devices transmitting state information to the remote controller according to a state request command from the remote controller and controlling a predetermined operation according to an operation control command from the remote controller; and
    the remote controller, supplied with power by a common power source, for transmitting the state request command to the an electric device selected by a user, receiving state information from the selected electric device, and displaying the state information according to a display priority, the remote controller transmitting the operation control command to the electric device, wherein:
    the remote controller receives and preferentially displays operation state information corresponding to another one of the electric devices when the selected electric device has top display priority,
    the remote controller receiving the operation state information of the other electric device while the remote controller displays the state information of the electric device selected by the user,
    the remote controller displaying the operation state information of the other electric device after receiving the operation state information of the other electric device, the operation state information of the other electric device automatically displayed in place of the state information of the electric device selected by the user, and after displaying the operation state information of the other electric device, the remote controller automatically re-displays the state information of the electric device selected by the user.

2. The remote controlling system of claim 1, wherein the electric device comprises
at least a transmitter/receiver for accessing the wireless communication network, and
a controller for performing the function of the electric device, and transmitting the state information to the remote controller through the transmitter/receiver or controlling the operation of the electric device according to the state request command or the operation control command from the transmitter/receiver.

3. The remote controlling system of claim 1, wherein the remote controller comprises
a power supply unit applied with common power, for supplying power,
a transmitter/receiver for accessing the wireless communication network,
an input for acquiring a user input,
a display for displaying the state info nation, and
a controller for selecting the electric device or generating the state request command or the operation control command for the selected electric device according to the user input, transmitting the state request command or the operation control command to the selected electric device through the transmitter/receiver, receiving the state information, and displaying the state information on the display.

4. A remote controlling method for an electric device in a remote controller communicating with one or more electric devices through a predetermined wireless communication network, the remote controlling method comprising:
receiving state information of one of the electric devices; and
displaying the state information according to display priority, wherein the remote controller receives and preferentially displays operation state information corresponding to another one of the electric devices when the selected electric device has top display priority, the remote controller receiving the operation state information of the other electric device while the remote controller displays the state information of the electric device selected by the user, the remote controller displaying the operation state information of the other electric device after receiving the operation state info nation of the other electric device, the operation state information of the other electric device automatically displayed in place of the state information of the electric device selected by the user, and
after displaying the operation state information of the other electric device, automatically re-displaying the state information of the electric device selected by the user.

5. The remote controlling method of claim 4, wherein the display priority comprises setting or user's selection for the displayed electric device.

6. The remote controlling method of claim 5, further comprising:
generating a state request command for the set or selected electric device, and
transmitting the state request command to the set or selected electric device,
wherein the display step performs the display operation according to the state information from the set or selected electric device, or according to reception or non-reception of the state information from the set or selected electric device.

7. The remote controlling method of claim 5, further comprising:
acquiring an operation control input for the set or selected electric device,
generating an operation control command according to the operation control input, and
transmitting the generated operation control command to the set or selected electric device, wherein the display step displays the state of the electric device corresponding to the operation control command.

8. The remote controlling method of claim 5, wherein, when the state information is error state information or operation end info nation, displaying the state information includes displaying the error state information or the operation end information corresponding to the set or selected electric device.

9. The remote controlling method of claim 4, wherein error state information or operation end information has top priority in the display priority.

10. The remote controlling method of claim 8, wherein displaying the state information includes displaying an operation end state based on the operation end info nation after a predetermined time.

11. The remote controlling method of claim 8, wherein displaying the state information includes displaying the state of an electric device which does not end an operation, after displaying the operation end state.

12. A remote controller comprising:
at least one receiver to receive state information of a plurality of devices through a wireless communication network,
a processor to receive information selecting one of the devices and to control transmission of a state request command to the selected device, the state information of the selected device received after transmission of the state request command; and
a display to display the state information of the devices, wherein:
the state information of the devices is based on display priority information,
when the state information of the selected device having a first display priority is displayed without display of state information of other ones of the devices, the state information of another device is automatically displayed in place of the state information of the selected device after the state information of the other electric device is received, and
the state information of the selected device is automatically re-displayed after the state information of the other electric device is displayed.

13. The remote controller of claim 12, wherein the state information of the selected device is automatically re-displayed after the state information of the other electric device is displayed without the state information of the other electric device being simultaneously displayed.

14. The remote controller of claim 12, wherein the first display priority is a top display priority and wherein the other device has a display priority lower than the top display priority.

15. The remote controller of claim 12, wherein the devices include at least one appliance.

* * * * *